(12) United States Patent
Purwin et al.

(10) Patent No.: US 11,725,689 B2
(45) Date of Patent: Aug. 15, 2023

(54) FASTENING ELEMENT

(71) Applicant: WITTE Automotive GmbH, Velbert (DE)

(72) Inventors: Harry Purwin, Ratingen (DE); Aykut Cöpür, Wuppertal (DE)

(73) Assignee: Witte Automotive GmbH, Velbert (DE)

( * ) Notice: Subject to any disclaimer, the term of this patent is extended or adjusted under 35 U.S.C. 154(b) by 214 days.

(21) Appl. No.: 17/200,979

(22) Filed: Mar. 15, 2021

(65) Prior Publication Data
US 2021/0301862 A1 Sep. 30, 2021

(30) Foreign Application Priority Data
Mar. 31, 2020 (DE) .................. 10 2020 204 180

(51) Int. Cl.
*F16B 19/00* (2006.01)
*F16B 43/02* (2006.01)
*F16B 43/00* (2006.01)

(52) U.S. Cl.
CPC ............ *F16B 43/02* (2013.01); *F16B 43/001* (2013.01)

(58) Field of Classification Search
CPC ............................... F16B 43/001; F16B 43/02
USPC ........................................................ 411/360
See application file for complete search history.

(56) References Cited

U.S. PATENT DOCUMENTS

| 6,357,953 B1* | 3/2002 | Ballantyne | ............ F16B 5/0233 403/372 |
|---|---|---|---|
| 6,585,447 B2* | 7/2003 | Schwarzbich | ........ F16B 5/0233 411/546 |
| 6,776,566 B2* | 8/2004 | Kobusch | ............... F16B 5/0283 411/432 |
| 7,037,027 B2* | 5/2006 | Steinbeck | ............... F16B 5/025 403/374.1 |
| 7,488,135 B2* | 2/2009 | Hasegawa | ............. F16B 5/0233 403/22 |

(Continued)

FOREIGN PATENT DOCUMENTS

| CN | 109790862 A | 5/2019 |
|---|---|---|
| CN | 209025984 U | 6/2019 |

(Continued)

OTHER PUBLICATIONS

German Patent and Trademark Office, Office Action in Application No. 10 2020 204 180.6, dated Oct. 12, 2020, 6 pages.

(Continued)

*Primary Examiner* — Gary W Estremsky
(74) *Attorney, Agent, or Firm* — Marshall & Melhorn, LLC

(57) ABSTRACT

A fastening element for connecting a first component to a second component may have a pin-like connecting element with a first fastening region and a second fastening region. The fastening element may also have a sleeve which is configured for insertion into a receiving opening of the first component. The fastening element may also have a compensation element which is provided with a receptacle for receiving the first fastening region and which is configured for insertion and adjustment in a longitudinal direction in the sleeve. At least one drive interface may be provided on the compensating element by which the compensating element can be adjusted in the longitudinal direction in the sleeve.

13 Claims, 5 Drawing Sheets

(56) References Cited

U.S. PATENT DOCUMENTS

Figure 1:
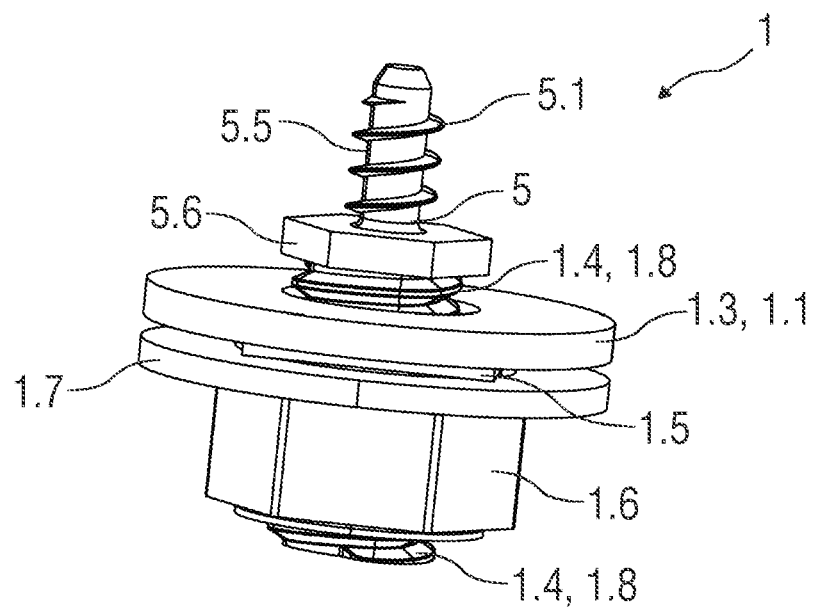

| | | | |
|---|---|---|---|
| 8,066,465 B2* | 11/2011 | Figge | F16B 19/1072 411/546 |
| 8,202,033 B2* | 6/2012 | Choi | B62D 27/065 411/546 |
| 8,864,432 B2* | 10/2014 | Figge | F16B 37/042 411/383 |
| 2003/0077118 A1 | 4/2003 | Kobusch et al. | |
| 2006/0280579 A1* | 12/2006 | Seidl | F16B 5/0233 411/546 |
| 2007/0009342 A1* | 1/2007 | Figge | F16B 5/025 411/546 |
| 2007/0207012 A1 | 9/2007 | Lorenzo | |
| 2009/0190993 A1 | 7/2009 | De Gelis | |
| 2010/0278612 A1* | 11/2010 | Steffenfauseweh | B60Q 1/045 411/395 |
| 2012/0272506 A1 | 11/2012 | Figge et al. | |
| 2014/0234054 A1* | 8/2014 | Lutgenau | F16B 43/009 411/537 |
| 2015/0330435 A1* | 11/2015 | Schwarzbich | F16B 5/0283 411/16 |
| 2016/0377105 A1 | 12/2016 | Schmidt | |
| 2017/0276165 A1 | 9/2017 | Matsunami et al. | |

FOREIGN PATENT DOCUMENTS

| | | |
|---|---|---|
| DE | 202009007421 U1 | 8/2009 |
| DE | 102019212136 A1 | 2/2021 |
| EP | 1764516 A2 | 3/2007 |
| EP | 2933144 A1 | 10/2015 |
| GB | 2412704 A | 10/2005 |
| WO | 2013064164 A1 | 5/2013 |
| WO | 2015110418 A1 | 7/2015 |
| WO | 2019120665 A1 | 6/2019 |
| WO | 2019121023 A1 | 6/2019 |

OTHER PUBLICATIONS

The State Intellectual Property Office of People's Republic of China, Office Action in Application No. CN202110302341.4, dated Jun. 27, 2022, 10 pages.

* cited by examiner

FASTENING ELEMENT

FIELD

The invention relates to a fastening element for a component, in particular for fastening to a body component of a vehicle.

BACKGROUND

EP 2 933 144 A1 discloses a device for at least partially fastening a motor vehicle light in an installation opening of a body of a motor vehicle, a motor vehicle light equipped therewith, and a method for arranging and adjusting such a device on a motor vehicle light. The device comprises a banjo bolt with an external thread and a central opening extending coaxially with the longitudinal axis of the banjo bolt, a threaded bolt which can be fixed to the motor vehicle light and which has a first threaded portion extending through the central opening, as well as a sleeve-shaped clamping part arranged coaxially between the banjo bolt and the threaded bolt in the central opening on the first threaded portion. The banjo bolt has a radially protruding collar which is arranged on one side of the external thread and which faces the motor vehicle light when the device is in the installed state. The clamping part is rotatably arranged in the central opening. The clamping part is arranged in the axial direction with a positive connection parallel to the longitudinal axis. The clamping part has a continuous axial opening which runs coaxially with the longitudinal axis, the inner diameter of which axial opening is less than the outer diameter of the first threaded portion. The clamping part comprises a projection which has a shape which can be brought into engagement with a tool in order to rotate the clamping part. At least one stop groove is arranged in the collar of the banjo bolt. In addition, a stop fixed on the motor vehicle light is provided, which, when the device is in the installed state, engages in at least one stop groove. In the method, the threaded bolt is first fixed on the motor vehicle light, then the banjo bolt is then screwed onto the first threaded portion, with the clamping part arranged in its central opening with the collar forward, until the stop fixed on the motor vehicle light engages in a stop groove; then an adjustment of the position of the hollow screw along the threaded bolt relative to the first threaded portion is performed by rotating the clamping part.

SUMMARY

The object of the present invention is to provide an improved fastening element.

According to the invention, the object is achieved by a fastening element having the features of the claims.

Further refinements of the invention are the subject matter of the dependent claims.

A fastening element according to the invention, for connecting a first component to a second component has:
- a pin-like connecting element with a first fastening region and a second fastening region,
- a sleeve which is configured for insertion into a receiving opening of the first component,
- a compensating element which is provided with a receptacle for receiving the first fastening region and which is configured for insertion and adjustment in the sleeve in a longitudinal direction, wherein at least one drive interface is provided on the compensating element, by means of which the compensating element can be adjusted in the sleeve in the longitudinal direction.

The fastening element according to the invention constitutes a releasable tolerance compensation element with subsequent axial adjustment and radial tolerance compensation.

The fastening element makes it possible to establish a (non-positive and/or positive) connection between two components, for example a vehicle body and a mounted part, by simply inserting and fastening the sleeve in the first component and screwing the connecting element into the second component. After installation, the fastening element can be adjusted by rotating the connecting element in the axial direction, and can be separated again by later pulling the connecting element out of the clip. The adjusted position is preserved for a further fastening.

The first component can be, for example, a carrier component, in particular a body panel of a vehicle.

The second component can be, for example, a mounted part such as a rear light or a side light.

In one embodiment, the second fastening region has a threaded portion for engaging in a receptacle of the second component. The threaded portion can be designed as a self-tapping or metric, in particular self-locking, thread which engages positively and/or non-positively in a receptacle of the second component, and which in particular screws into the receptacle. In a further embodiment, the second fastening region can be fixed, in particular pressed, glued, injected or clipped, in the second component, or formed in one piece with the second component.

In one embodiment, the drive interface is designed as a lower drive interface that points away from the connecting element inserted into the compensating element, and/or the drive interface is designed as an upper drive interface that points towards the connecting element inserted into the compensating element. In this way, the compensation element can be adjusted when the sleeve is fastened in the first component and the connecting element is screwed in the second component.

In one embodiment, the drive interface comprises a hexagonal or square head or recess, a hexalobular external or internal driving feature, a slot, or a cross slot. Other shapes of the drive interface are also possible.

In one embodiment, the compensating element and the sleeve have threads that are complementary to each other. In this way, the adjustment can take place in the longitudinal direction by turning.

In one embodiment, the connecting element is held in the receptacle in a releasable manner, but retrained against removal. In this way, the second component can be taken off the first component, and placed back on it. The axial distance adjusted previously in the second component by rotating the connecting element is preserved in this case.

In one embodiment, the compensating element is designed to be elastic in the region of the receptacle.

In one embodiment, a separating flange is provided on the connecting element to separate the first fastening region from the second fastening region.

In one embodiment, a nut is provided for screwing onto the sleeve in order to hold the fastening element on the first component by means of a screw connection. Alternatively, clip connections are also possible.

In one embodiment, the nut and the sleeve have mutually complementary teeth which are configured to inhibit loosening of, or losing, the nut.

In one embodiment, a spring element for a positive or non-positive connection of the compensating element is arranged in the receptacle on the connecting element. Such a spring element fixed axially in both directions within the receptacle can transmit forces, such as an insertion force and an extraction force, in particular compressive or tensile forces, axially in both directions, and can dissipate them in the direction of the receptacle, such that the fastening element can be used multiple times.

In one embodiment, the sleeve has an interface to be accommodated in the receiving opening of the first component, wherein the interface has a cross-section which deviates from the circular shape, and/or wherein the interface has a smaller cross-section than the receiving opening. Rotation of the sleeve in the receiving opening is thus inhibited, and/or a position adjustment transverse to the longitudinal direction is made possible.

DRAWING DESCRIPTION

Figure 2:
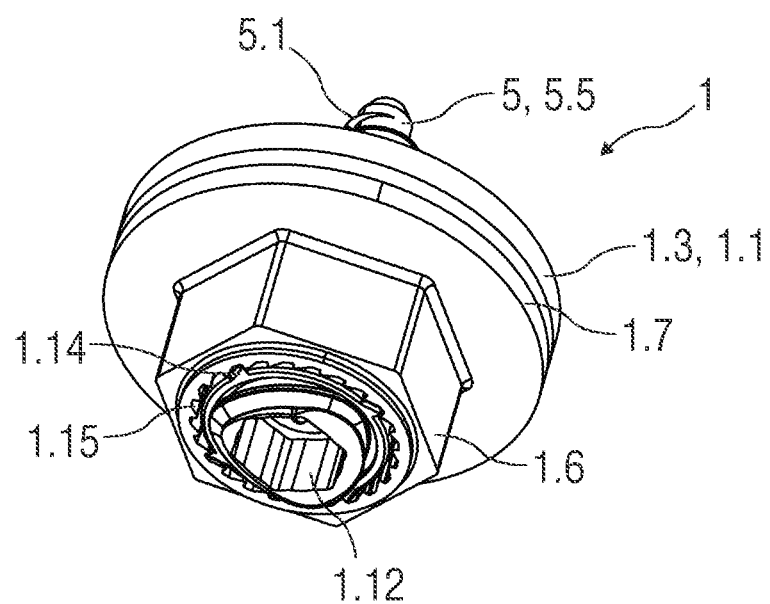
Figure 3:
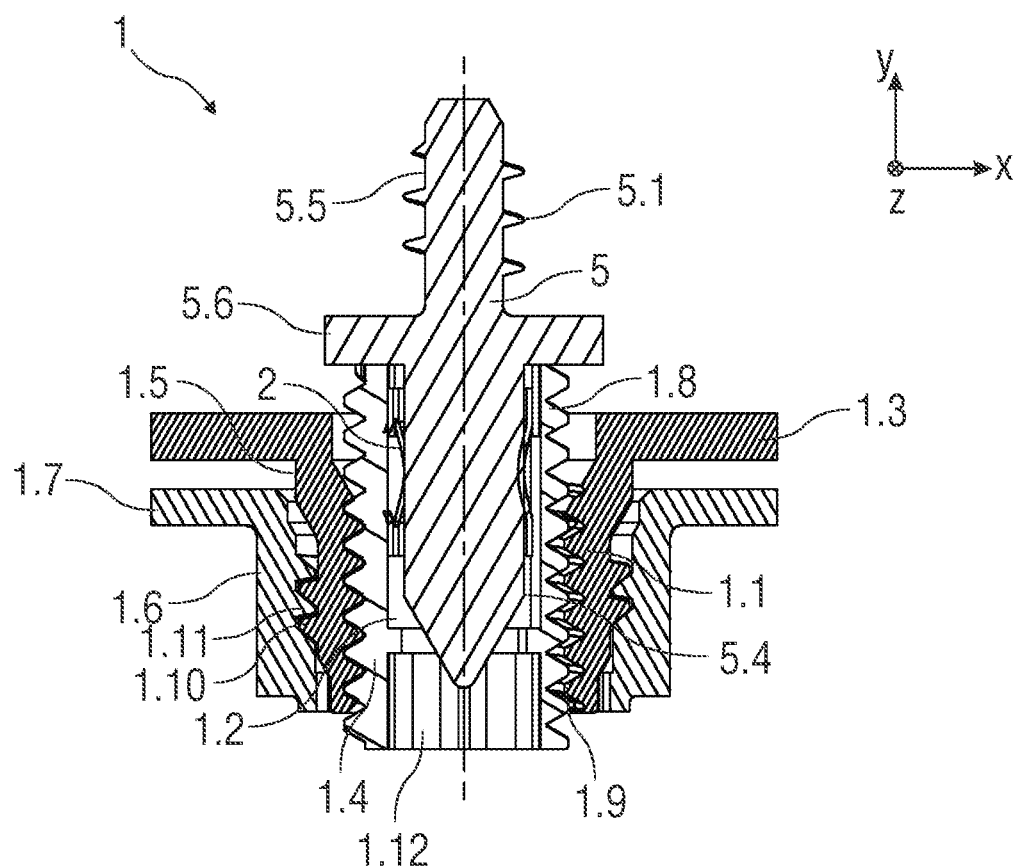
Figure 4:
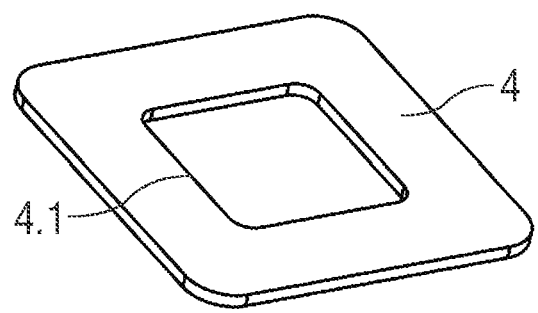
Figure 5:
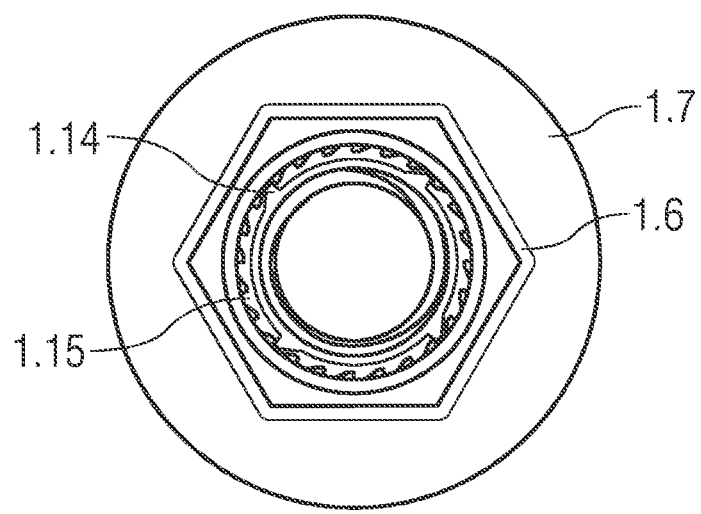
Figure 6:
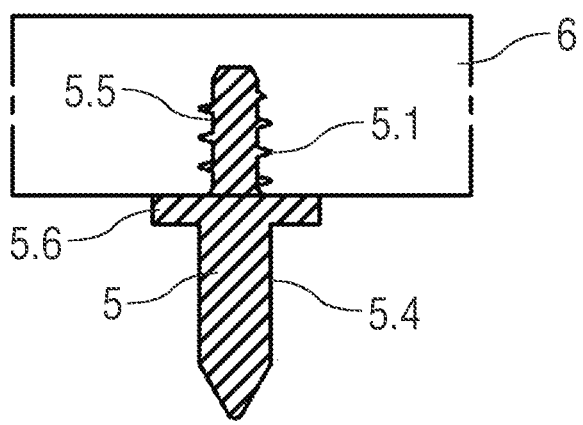
Figure 7:
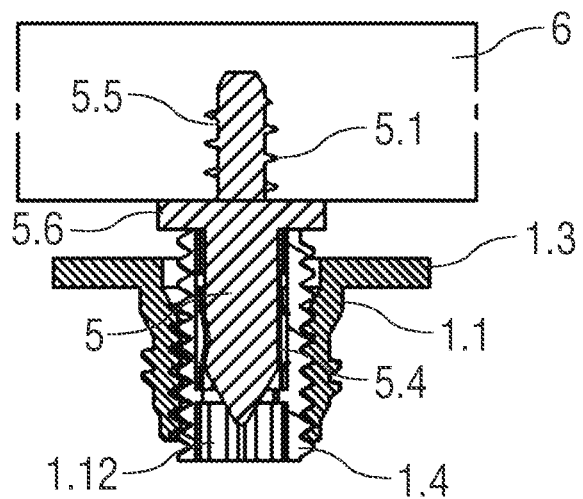
Figure 8:
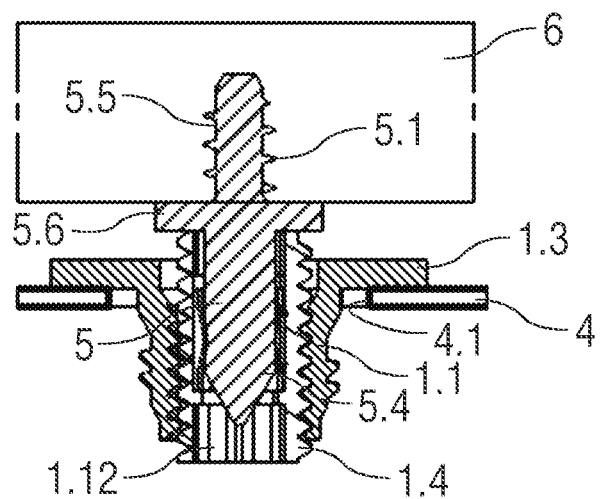
Figure 9:
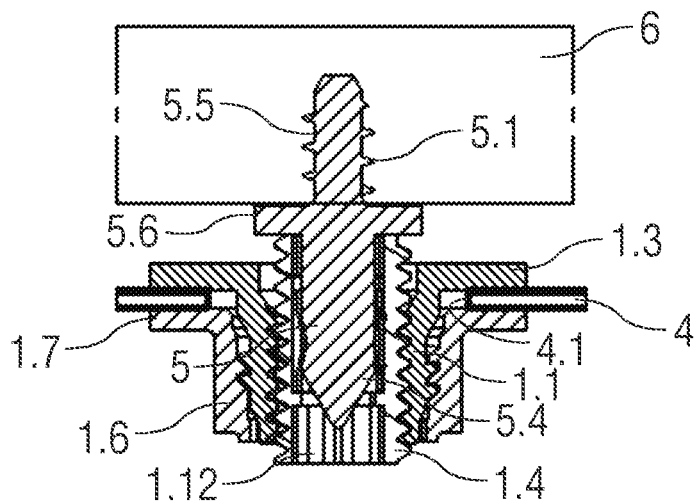
Figure 10:
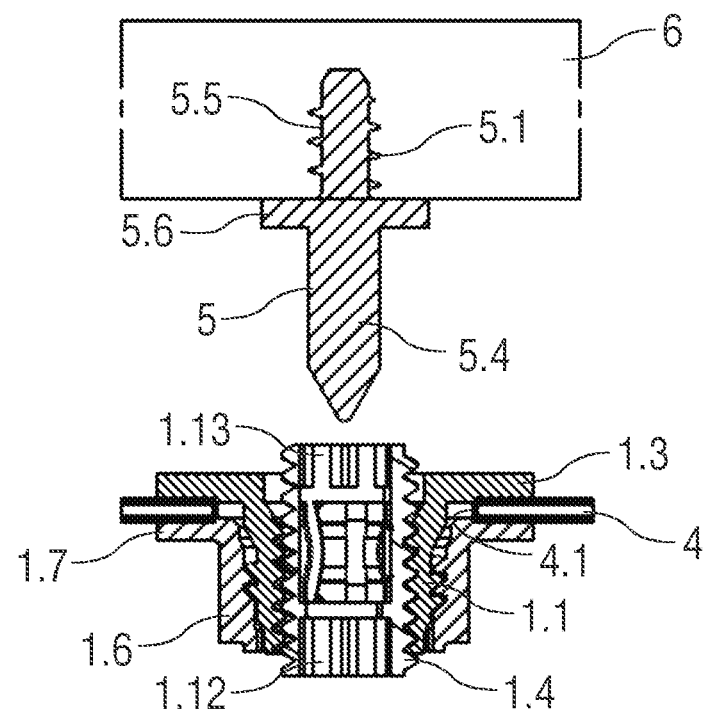

Exemplary embodiments of the invention are explained in greater detail with reference to drawings, in which:

FIG. 1 is a schematic view of a fastening element for connecting a first component to a second component, FIG. 2 is a schematic view of the fastening element obliquely from below, with a view of a lower drive interface, FIG. 3 is a schematic sectional view of the fastening element, FIG. 4 is a schematic view of a portion of the first component, with a receiving opening, FIG. 5 is a schematic view of the fastening element from below, FIG. 6 is a schematic view of a connecting element fastened in the receptacle of the second component, FIG. 7 is a schematic view of a sleeve with a compensating element inserted therein, which is fastened to the connecting element, FIG. 8 is a schematic view of the fastening element inserted into the first component, and of the second component connected to it, FIG. 9 is a schematic view of the fastening element inserted into the first component and fastened with a nut, and of the second component connected thereto, and FIG. 10 is a schematic view of the fastening element after the second component has been taken off the first component.

DESCRIPTION

Corresponding parts are indicated by the same reference numerals in all figures.

FIG. 1 is a schematic view of a fastening element 1 for connecting a first component 4 to a second component 6 and for compensating for tolerances between the first component 4 and the second component 6. FIG. 2 is a schematic view of the fastening element 1 obliquely from below, with a view of a lower drive interface 1.12. FIG. 3 is a schematic sectional view of the fastening element 1. FIG. 4 is a schematic view of a portion of the first component 4, with a receiving opening 4.1. FIG. 5 is a schematic view of the fastening element 1 from below.

The fastening element 1 can be substantially cylindrical, and has a sleeve 1.1.

The fastening element 1 can be constructed in one or more parts, and can be formed, for example, from a metal or plastics material or from a combination of metal parts and plastic parts.

Another aspect provides that the sleeve 1.1 has a head portion 1.3, which can be designed as a seal element, for example in the shape of a disk or a mushroom head, and which has a greater diameter than the sleeve 1.1. Alternatively, the head portion 1.3 can also solely comprise at least two sectors, for example three sectors, of a mushroom head. The sleeve 1.1 forms a socket of the fastening element 1. The sleeve 1.1 and the head portion 1.3 can be formed as one component, in particular made of plastic. For example, the sleeve 1.1 and the head portion 1.3 are designed as a 2-component injection-molded plastics part. The sleeve 1.1 can be formed from a harder plastic material, and the head portion 1.3 from a softer plastic material.

A compensation element 1.4 can be arranged in the sleeve 1.1 in an adjustable manner, in particular adjustable in an axial direction y of the sleeve 1.1. The sleeve 1.1 and the compensating element 1.4 can be provided with mutually complementary threads 1.8, 1.9.

The compensating element 1.4 is provided with a receptacle 1.2, in particular with a hollow cylindrical shape.

A spring element 2, which for example is made of metal, in particular made of a steel material, preferably spring steel, can be arranged in the receptacle 1.2.

The fastening element 1 also has a pin-like connecting element 5.

The first component 4 is, for example, a carrier component, in particular a body panel of a vehicle. The receiving opening 4.1 can have a cross-section which deviates from the circular shape. The sleeve 1.1 can have an interface 1.5 which is complementary to the receiving opening 4.1. The receiving opening 4.1 can also be made larger than the interface 1.5, in order to allow for position compensation in transverse directions x and z transverse to the axial direction y of the sleeve 1.1.

In particular, the receiving opening 4.1 and the interface 1.5 can each have an approximately square cross-section, preferably with rounded corners.

The receptacle 1.2 in the compensating element 1.4 is designed to be open at least on one side, in particular on the head side, for receiving a connecting element 5. In particular, the receptacle 1.2 can also be designed as a through opening at the bottom end as well, and can thus be open on both sides.

A second component 6, for example a mounted part such as a rear light or a side light, can be fastened in an axially adjustable manner on the first component 4, for example a carrier component such as a body panel.

The fastening element 1 can be preassembled on the first component 4, for example on the vehicle component. By way of example, the fastening element 1 can be arranged in a receiving opening 4.1 of the first component 4 by means of a latching or clamping connection, and held there with a positive and/or non-positive connection. In the embodiment shown, a nut 1.6 is provided which can be screwed onto the sleeve 1.1 in order to hold the fastening element 1 on the first component 4 by means of a screw connection. For this purpose, further complementary threads 1.10, 1.11 can be provided in the nut 1.6 and on the sleeve 1.1. Furthermore, the nut 1.6 can have a collar 1.7 for resting on the first component 4.

Likewise, the connecting element 5 can be preassembled on the second component 6, for example on the rear light or side light. By way of example, the connecting element 5 has a threaded portion 5.1. The threaded portion 5.1 can be designed as a self-tapping or metric, in particular self-locking, thread which engages positively and/or non-positively, in particular screws, in a receptacle of the second component 6. Alternatively, the connecting element 5 can be fixed, for example pressed, glued, injected or clipped, in the second component 6.

Subsequently, the connecting element 5 with the pre-assembled second component 6 is fastened to the first component 4, wherein the connection of the two components 4 and 6 is axially adjustable.

The connecting element 5 is designed as a bolt which has a separating flange 5.6 to separate a first fastening region 5.4 for the receptacle 1.2 in the compensating element 1.4 from a second fastening region 5.5 for the second component 6. The separating flange 5.6 projects radially outwards and is designed with the shape of a disk, in the manner of a bolt collar, and can be provided with a hexagon or square.

In one embodiment, a lower drive interface 1.12 is provided on the compensation element 1.4, for example a hexagonal or square head or recess, a hexalobular external or internal driving feature, a slot, or a cross slot. The lower drive interface 1.12 in particular points away from the connecting element 5 inserted into the compensating element 1.4, and can protrude from the sleeve 1.1 when the compensating element 1.4 is arranged in the sleeve 1.1.

In one embodiment, an upper drive interface 1.13, for example a hexagonal or square head or recess, a hexalobular external or internal driving feature, a slot, or a cross slot, is alternatively or additionally provided on the compensating element 1.4. The upper drive interface 1.13 points in particular toward the connecting element 5 inserted into the compensating element 1.4, and is accessible in particular when the connecting element 5 is not inserted into the compensating element 1.4.

The nut 1.6 and the compensating element 1.4 can have teeth 1.14, 1.15 which are complementary to each other and which inhibit or prevent loosening of, or losing, the nut 1.6.

By fastening the threaded portion 5.1 in the receptacle of the second component 6, for example by screwing it in, an assembly can be formed, as shown in FIG. 6. The threaded portion 5.1 can, for example, be screwed in until the separating flange 5.6 hits the second component 6.

In one embodiment, the sleeve 1.1 with the compensating element 1.4 inserted therein, as shown in FIG. 7, is fastened to the connecting element 5, for example with a positive and/or non-positive connection. This connection, for example via the spring element 2, can be released again by pulling the connecting element 5 out of the receptacle 1.2. For this purpose, the compensation element 1.4 can be designed to be correspondingly elastic.

Alternatively, the sleeve 1.1 with the compensating element 1.4 inserted therein is already fastened to the connecting element 5 prior to the assembly of the components 4, 6, for example with a positive and/or non-positive connection.

The assembly comprising the second component 6 and the fastening element 1 fastened in the receptacle can be brought to the first component 4, for example a body panel of a vehicle, wherein the sleeve 1.1 can be inserted into the receiving opening 4.1 of the first component 4 as shown in FIG. 8. FIG. 8 is a schematic view of the fastening element 1 inserted into the first component 4, and of the second component 6 connected to it. In this state, a position compensation can take place in the transverse directions x and z, transverse to the axial direction y of the sleeve 1.1. The cutout 4.1 can also have a smaller diameter than the head portion 1.3.

FIG. 9 is a schematic view of the fastening element 1 inserted into the first component 4, and of the second component 6 connected to it, wherein the nut 1.6 is screwed onto the sleeve 1.1. The fastening element 1 is thus fastened to the first component 4 and fixed with respect to the transverse directions x and z.

After the second component 6 has been accordingly installed on the first component 4 by means of the fastening element 1, an axial position of the second component 6 relative to the first component 4 can be adjusted by rotating the compensating element 1.4 by means of the lower drive interface 1.12. If the second component 6 is then taken off in the axial direction y as shown in FIG. 10, the bolt-shaped connecting element 5 remains in the receptacle 6.1 of the second component 6, and the sleeve 1.1, the compensating element 1.4, and the nut 1.6 remain in the receiving opening 4.1 of the first component 4, for example a carrier component such as a body panel. FIG. 10 is a schematic view of the fastening element 1 after the second component 6 has been taken off the first component 4.

In this state, the upper drive interface 1.13 is also accessible, such that the compensating element 1.4 can also be adjusted in this way in the axial direction y.

In an alternative embodiment, the receptacle 1.2 and the connecting element 5 in the first fastening region 5.4 can comprise a circumferential groove of the connecting element 5 and a bulge of the receptacle 1.2 complementary thereto.

In an alternative embodiment, the receptacle 1.2 and the connecting element 5 can comprise, in the first fastening region 5.4, a radial bulge of the connecting element 5 and a circumferential groove complementary thereto in the receptacle 1.2.

In an alternative embodiment, the receptacle 1.2 and the connecting element 5 can comprise, in the first fastening region 5.4, a radial bulge of the connecting element 5 and a complementary circumferential groove in the receptacle 1.2, wherein the bulge can run in the direction of the second component 6 at a shallower angle relative to the connecting element 5 than in the opposite direction, such that the connecting element 5 can be more easily inserted into the receptacle 1.2 than pulled out of it.

In an alternative embodiment, the connecting element 5 can have a circumferential groove in the first fastening region 5.4, and the receptacle 1.2 can have, on its inside, elastic arms complementary thereto which engage in the groove. The elastic arms can be fastened to the receptacle 1.2 at their end facing the head portion 1.3, and can protrude in the opposite direction. The groove in the connecting element 5 can extend in the direction away from the second component 6 at a steeper angle relative to the connecting element 5 than in the opposite direction, such that the connecting element 5 can be more easily inserted into the receptacle 1.2 than pulled out of it.

In an alternative embodiment, the connecting element 5 can have a circumferential groove in the first fastening region 5.4 and the receptacle 1.2 can have a complementary bulge on its inside which engages in the groove. The groove in the connecting element 5 can extend in the direction away from the second component 6 at a steeper angle relative to the connecting element 5 than in the opposite direction, such that the connecting element 5 can be more easily inserted into the receptacle 1.2 than pulled out of it.

In an alternative embodiment, the connecting element 5 can be formed cylindrically in the first fastening region 5.4, and the receptacle 1.2 can also be formed cylindrically on its inside, complementary thereto.

In an alternative embodiment, the connecting element 5 can be formed substantially cylindrically in the first fastening region 5.4 and provided with a corrugation, and the receptacle 1.2 can likewise be formed substantially cylindrically on its inside. A spring element 2 is arranged in the receptacle 1.2 and is firmly connected axially in both directions to an inside of the receptacle 1.2.

Such a spring element 2 fixed axially in both directions within the receptacle 1.2 can transmit forces, such as an insertion force and an extraction force, in particular compressive or tensile forces, axially in both directions, and can dissipate them in the direction of the receptacle 1.2, such that the fastening element 1 can be used multiple times.

In one possible embodiment, the sleeve 1.1 is made of plastic and the spring element 2 is made of metal.

The spring element 2 comprises, for example, a base body from which spring arms protrude radially outward, which engage positively and/or non-positively in the inside of the receptacle 1.2. Axial forces and their dissipation in both directions can be adjusted in a targeted manner by means of the spring arms.

The base body of the spring element 2 is, for example, sleeve-shaped. The plurality of spring arms is arranged or formed one above the other in a plurality of rows, for example along a longitudinal extension of the base body. The spring arms can be arranged or formed diametrically opposite each other with respect to the base body.

Such an arrangement, in particular a two-sided or two-row arrangement, of spring arms on the base body enables symmetrical force transmission and dissipation.

Alternatively, a one-sided or one-row arrangement of spring arms can be formed on the base body, which allows for an asymmetrical force transmission and dissipation.

In addition, the base body can have a wave-shaped section in some regions outside of the rows of spring arms. This wave-shaped section of the base body allows for a frictional or clamping connection with the inside of the receptacle 1.2 outside of the positive and/or non-positive connection of the spring arms with the inside.

The spring arms can project radially outwards and then penetrate into the inside of the receptacle 1.2, when inserted in the receptacle 1.2, and form a positive and/or non-positive connection with the inside of the receptacle 1.2.

In addition, the base body can have spring arms which are directed radially inward and which protrude radially inward from the base body.

For example, adjacent spring arms and at least one of the rows have spring ends directed alternately radially outward and radially inward.

In addition, the spring arms of one or of each of the rows can be arranged at an axial distance from each other. This enables axial adjustability of the connection, for example by means of corresponding distances in adjustment steps. This enables axial adjustment steps to compensate for tolerances, in particular small component tolerances, in small steps of, for example, 0.2 cm to 1 cm, in particular 0.35 cm.

The spring arms can be designed as latching arms, ratchets, or clamping arms, or in another suitable shape which enables a positive and/or non-positive connection with an adjoining surface, such as the inside of the receptacle 1.2.

In all embodiments, the receptacle 1.2 can be formed like a funnel in the region of the head portion 1.3, in order to facilitate the insertion of the connecting element 5.

LIST OF REFERENCE SIGNS

1 fastening element
1.1 sleeve
1.2 receptacle
1.3 head portion
1.4 compensation element
1.5 interface
1.6 nut
1.7 collar
1.8 thread
1.9 thread
1.10 thread
1.11 thread
1.12 lower drive interface
1.13 upper drive interface
1.14 teeth
1.15 teeth
2 spring element
4 first component
4.1 receiving opening
5 connecting element
5.1 threaded portion
5.4 first fastening region
5.5 second fastening region
5.6 separating flange
6 second component
x transverse direction
y axial direction
z transverse direction

What is claimed is:

1. A fastening element for connecting a first component to a second component, wherein the fastening element has:
    a pin-like connecting element with a first fastening region and a second fastening region,
    a sleeve which is configured for insertion into a receiving opening of the first component,
    a compensation element which is provided with a receptacle for receiving the first fastening region and which is configured for insertion and adjustment in a longitudinal direction in the sleeve,
    wherein at least one drive interface is provided on the compensating element by which the compensating element can be adjusted in the longitudinal direction in the sleeve,
        wherein a separating flange is provided on the connecting element to separate the first fastening region from the second fastening region.

2. The fastening element according to claim 1, wherein the second fastening region has a threaded portion for engaging in a receptacle of the second component or wherein the second fastening region is fixed, in particular, pressed, glued, injected, or clipped, in the second component, or is formed in one piece with the second component.

3. The fastening element according to claim 1, wherein the drive interface is designed as a lower drive interface which faces away from the connecting element inserted into the compensating element and/or wherein the drive interface is designed as an upper drive interface which points towards the connecting element inserted into the compensating element.

4. The fastening element according to claim 1, wherein the drive interface comprises a hexagonal or square head or recess, a hexalobular external or internal driving feature, a slot or a cross slot.

5. The fastening element according to claim 1, wherein the compensating element and the sleeve have threads which are complementary to each other.

6. The fastening element according to claim 1, wherein a nut is provided for screwing onto the sleeve in order to hold the fastening element on the first component via of a screw connection.

7. The fastening element according to claim 6, wherein the nut and the sleeve have mutually complementary teeth which are configured to inhibit loosening of, or losing, the nut.

8. The fastening element according to claim 1, wherein a spring element is arranged in the receptacle for a positive and/or non-positive connection of the compensating element on the connecting element.

9. The fastening element according to claim 1, wherein the sleeve has an interface to be accommodated in the receiving opening of the first component, wherein the interface has a cross-section deviating from the circular shape and/or wherein the interface has a smaller cross-section than the receiving opening.

10. The fastening element according to claim 3, wherein an axial position of the second component is adjusted relative to the first component by rotating the compensating element connected to the lower drive interface.

11. The fastening element according to claim 8, wherein the spring element has a base body with spring arms, wherein the spring arms selectively engage an inside surface of the receptacle with an axial force, wherein the springs arms accommodate axial adjustability of the connecting element with respect to the receptacle.

12. A fastening element for connecting a first component to a second component, wherein the fastening element has:
   a pin-like connecting element with a first fastening region and a second fastening region,
   a sleeve which is configured for insertion into a receiving opening of the first component,
   a compensation element which is provided with a receptacle for receiving the first fastening region and which is configured for insertion and adjustment in a longitudinal direction in the sleeve,
   wherein at least one drive interface is provided on the compensating element by which the compensating element can be adjusted in the longitudinal direction in the sleeve,
   wherein a nut is provided for screwing onto the sleeve in order to hold the fastening element on the first component via of a screw connection.

13. A fastening element for connecting a first component to a second component, wherein the fastening element has:
   a pin-like connecting element with a first fastening region and a second fastening region,
   a sleeve which is configured for insertion into a receiving opening of the first component,
   a compensation element which is provided with a receptacle for receiving the first fastening region and which is configured for insertion and adjustment in a longitudinal direction in the sleeve,
wherein at least one drive interface is provided on the compensating element by which the compensating element can be adjusted in the longitudinal direction in the sleeve,
wherein a spring element is arranged in the receptacle for a positive and/or non-positive connection of the compensating element on the connecting element,
wherein the spring element has a base body with spring arms, wherein the spring arms selectively engage an inside surface of the receptacle with an axial force, wherein the springs arms accommodate axial adjustability of the connecting element with respect to the receptacle.

* * * * *